US011095756B1

(12) United States Patent
Bowman et al.

(10) Patent No.: US 11,095,756 B1
(45) Date of Patent: Aug. 17, 2021

(54) MULTI-TENANT COMPUTER SYSTEMS FOR PRODUCING SERVICE RESULTS IN RESPONSE TO SERVICE REQUESTS FROM CLIENT COMPUTE DEVICES, AND METHODS FOR THE SAME

(71) Applicant: Flueid Software Corporation, Austin, TX (US)

(72) Inventors: Peter Bowman, Santa Barbara, CA (US); Peter Richter, Austin, TX (US); Dennis Frandsen, Dallas, TX (US); Ryan Jaeger, Ventura, CA (US)

(73) Assignee: Flueid Software Corporation, Austin, TX (US)

( * ) Notice: Subject to any disclaimer, the term of this patent is extended or adjusted under 35 U.S.C. 154(b) by 0 days.

(21) Appl. No.: 17/214,620

(22) Filed: Mar. 26, 2021

(51) Int. Cl.
*H04L 29/08* (2006.01)
*H04L 29/06* (2006.01)

(52) U.S. Cl.
CPC .......... *H04L 67/34* (2013.01); *H04L 63/0428* (2013.01); *H04L 63/0807* (2013.01); *H04L 67/1095* (2013.01); *H04L 67/40* (2013.01)

(58) Field of Classification Search
CPC . H04L 67/34; H04L 63/0807; H04L 63/0428; H04L 67/1095; H04L 67/40
See application file for complete search history.

(56) References Cited

U.S. PATENT DOCUMENTS

| | | | |
|---|---|---|---|
| 7,212,995 B2 | 5/2007 | Schulkins | |
| 7,653,592 B1 | 1/2010 | Flaxman et al. | |
| 10,176,540 B2 | 1/2019 | Blackman et al. | |
| 10,846,807 B2 | 11/2020 | Blackman et al. | |
| 2003/0036994 A1 | 2/2003 | Witzig et al. | |
| 2004/0059653 A1 | 3/2004 | Verkuylen et al. | |
| 2005/0209867 A1 | 9/2005 | Diesch et al. | |

(Continued)

OTHER PUBLICATIONS

Vizuri, Improving Speed and Accuracy of Underwriting for a Fortune 100 Insurance Company, Retrieved from the Internet: https://www.vizuri.com/hubfs/Fortune%20100%20Insurance%20Case%20Study.pdf?hsLang=en-us. Publication date unavailable; no archive available on archive.org.

*Primary Examiner* — Shean Tokuta
(74) *Attorney, Agent, or Firm* — Cooley LLP

(57) ABSTRACT

In some embodiments, a non-transitory processor-readable medium receives, from a client compute device and at a multi-tenant computer system, a service request that includes an authentication token provided by a third-party compute device and that identifies a single-tenant account (1) of the multi-tenant computer system and (2) associated with the client compute device. The medium sends an information request for first information associated with the service request to the third-party compute device. The medium receives the first information from the third-party compute device in response to the information request. The medium processes the service request based on the first information to produce a service result responsive to the service request. The medium sends the service result to the client compute device. The medium sends, to the third-party compute device, second information including at least one of billing data, reporting data or performance data associated with the service request and the service result.

21 Claims, 4 Drawing Sheets

(56) References Cited

U.S. PATENT DOCUMENTS

| | | | |
|---|---|---|---|
| 2015/0235310 A1* | 8/2015 | Rozman | G06Q 40/025 |
| | | | 705/38 |
| 2017/0186084 A1* | 6/2017 | Koch | G06Q 40/02 |
| 2017/0270602 A1* | 9/2017 | Snell | G06F 16/122 |
| 2018/0082072 A1* | 3/2018 | Hosie | G06F 21/6245 |
| 2019/0318122 A1* | 10/2019 | Hockey | H04L 63/0853 |
| 2020/0125700 A1* | 4/2020 | Chang | H04L 67/2804 |
| 2020/0310599 A1* | 10/2020 | Mukherjee | G06F 9/451 |
| 2020/0412735 A1* | 12/2020 | Suhail | H04L 63/105 |
| 2021/0035245 A1 | 2/2021 | Blackman et al. | |
| 2021/0065141 A1* | 3/2021 | Batra | G06F 9/547 |
| 2021/0081947 A1* | 3/2021 | Hockey | G06F 21/62 |

* cited by examiner

200

Receive, from a client compute device and at a multi-tenant computer system, a service request that includes an authentication token provided by a third-party compute device and that identifies a single-tenant account (1) of the multi-tenant computer system and (2) associated with the client compute device 201

Send, from the multi-tenant computer system to the third-party compute device, an information request for a first set of information associated with the service request 202

Receive, at the multi-tenant computer system from the third-party compute device, the first set of information in response to the information request 203

Process, at the multi-tenant computer system, the service request based on the first set of information to produce a service result responsive to the service request 204

Send, to the client compute device and from the multi-tenant computer system, the service result 205

Send, to the third-party compute device and from the multi-tenant computer system, a second set of information including billing data or performance data 206

Receive, from a client compute device and at a multi-tenant computer system, a service request that includes an authentication token provided by a third-party compute device and that identifies a single-tenant account (1) of the multi-tenant computer system and (2) associated with the client compute device 301

Send, from the multi-tenant computer system to the third-party compute device, an information request for a first set of information associated with the service request 302

Receive, at the multi-tenant computer system from the third-party compute device, the first set of information in response to the information request 303

Process separately for each fourth party from a set of fourth parties, at the multi-tenant computer system, the service request based on the first set of information to produce a set of service results responsive to the service request 304

Send, to the client compute device and from the multi-tenant computer system, the service result 305

Send, from the multi-tenant computer system, a second set of information associated with the service request and the set of service results 306

> Define a software instantiation that is (1) to be included within a set of software instantiations, (2) stored in at least one multi-tenant computer system, and (3) uniquely associated with a single-tenant account to be included within a set of single-tenant accounts 401

↓

> Receive, from a client compute device to be included within a set of client compute devices and at the at least one multi-tenant computer system via an application programming interface (API), a service request that includes an authentication token provided by a third-party compute device and that identifies the single-tenant account, the single-tenant account being associated with the client compute device 402

↓

> Send, from the at least one multi-tenant computer system and to the third-party compute device, an information request for a first set of information associated with the service request 403

↓

> Receive, at the at least one multi-tenant computer system and from the third-party compute device, the first set of information in response to the information request 404

↓

> Automatically process separately for each fourth party from a set of fourth parties, at the at least one multi-tenant computer system, the service request (1) without using a different software for any two fourth parties from the set of fourth parties, (2) based on a set of customizable parameters (a) from a set of sets of customizable parameters and (b) specific to that fourth party, and (3) based on the first set of information, to produce a set of service results responsive to the service request 405

↓

> Send, to the client compute device and from the at least one multi-tenant computer system, the set of service results 406

↓

> Send, to the third-party compute device and from the at least one multi-tenant computer system, a second set of information associated with the service request and the set of service result 407

MULTI-TENANT COMPUTER SYSTEMS FOR PRODUCING SERVICE RESULTS IN RESPONSE TO SERVICE REQUESTS FROM CLIENT COMPUTE DEVICES, AND METHODS FOR THE SAME

TECHNICAL FIELD

The present disclosure relates to the field of computer network communication systems, and in particular to methods and apparatus for producing service results at a multi-tenant platform in response to service requests received from client compute devices.

BACKGROUND

Some known methods for processing information about a service request remain mostly manual, which are inefficient, expensive, and error-prone. Thus, a need exists for computer network communication systems and methods that can securely and efficiently produce service results in response to service request.

SUMMARY

In some embodiments, a non-transitory processor-readable medium can store code representing instructions to be executed by a processor. The medium can include code to receive, from a client compute device and at a multi-tenant computer system, a service request that includes an authentication token provided by a third-party compute device and that identifies a single-tenant account (1) of the multi-tenant computer system and (2) associated with the client compute device. The medium can include code to send, from the multi-tenant computer system to the third-party compute device, an information request for a first set of information associated with the service request. The medium can include code to receive, at the multi-tenant computer system from the third-party compute device, the first set of information in response to the information request. The medium can include code to process, at the multi-tenant computer system, the service request based on the first set of information to produce a service result responsive to the service request. The medium can include code to send, to the client compute device and from the multi-tenant computer system, the service result. The medium can include code to send, to the third-party compute device and from the multi-tenant computer system, a second set of information including at least one of billing data, reporting data, or performance data associated with the service request and the service result.

BRIEF DESCRIPTION OF THE DRAWINGS

FIG. 2 is a flowchart of a method of processing a service request and producing service results in response to the service request, according to an embodiment.

FIG. 3 is a flowchart of a method of processing a service request separately for each fourth party from a set of fourth parties and producing service results in response to the service request, according to an embodiment.

FIG. 4 is a flowchart of a method of processing a service request of a software instantiation of a client from a set of software instantiations for a set of clients, and producing service results in response to the service request, according to an embodiment.

DETAILED DESCRIPTION

Figure 1:
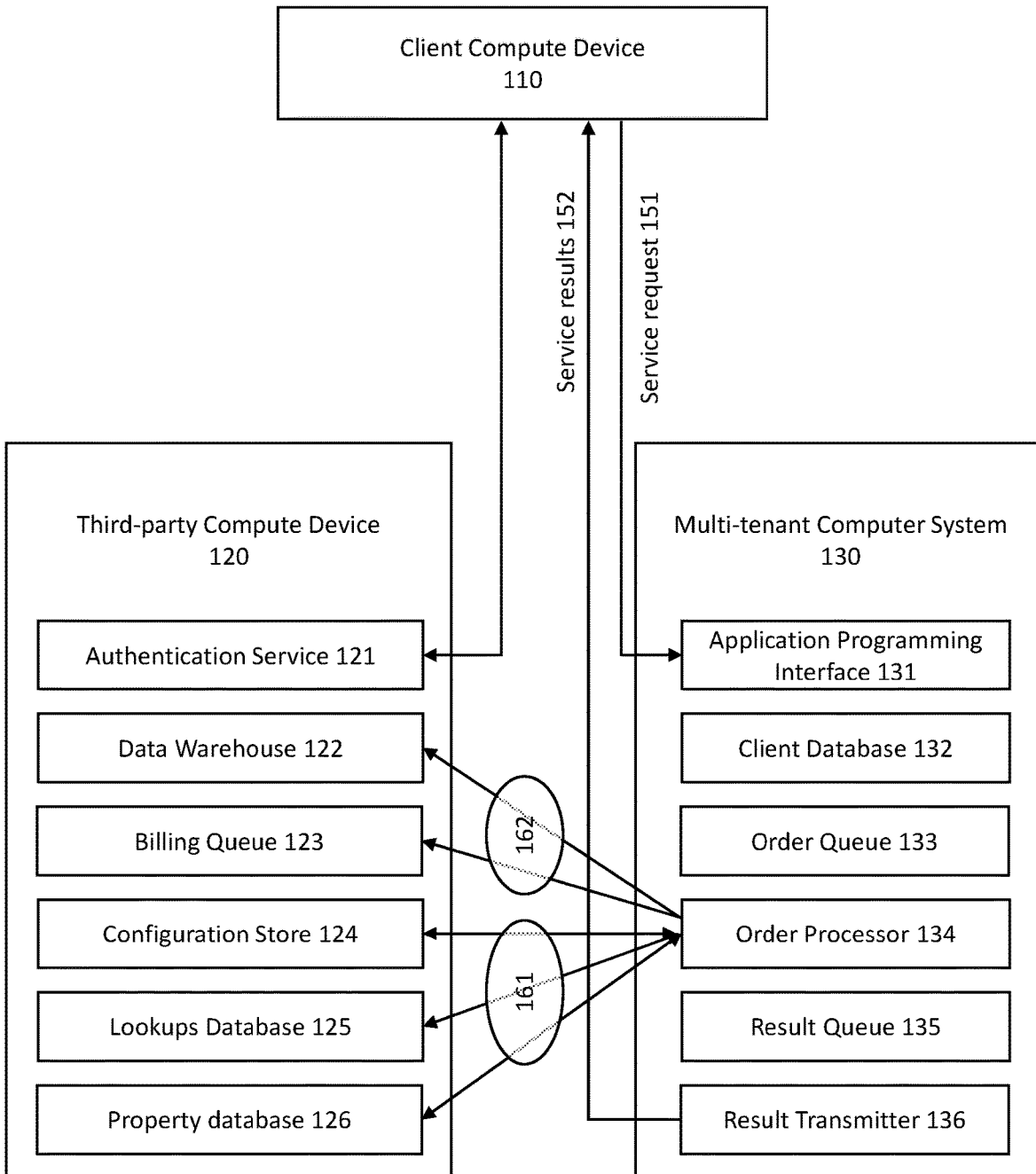
FIG. 1 is a block diagram of a multitenant computing environment, according to an embodiment.

Non-limiting examples of various aspects and variations of the embodiments are described herein and illustrated in the accompanying drawings.

One or more embodiments described herein generally relate to apparatus and methods for producing service results in response to a service request in a multi-tenant setting. In particular, the multi-tenant systems and methods described herein can automatically process a high number of orders or requests in an expedited fashion and consecutively lower cost. For example, the multi-tenant systems and methods described herein can reduce time, cost and/or effort associated with setting up a software environment, performing client-specific updates (e.g., security updates, software updates, and/or the like) and/or maintenance on a client compute device. Otherwise, setting up individual software environments at the client compute device, and communicating and processing information would be more time-consuming, costly, and more difficult to maintain for the client. Moreover, the multi-tenant systems and methods described herein can process a high volume of requests from multiple clients and a high volume of information from multiple fourth parties securely in a cost-efficient manner.

Use of the multi-tenant systems and methods described herein enables, for example, each client compute device from a set of client compute devices to have a single-tenant account and access a software instantiation stored and executed on the multi-tenant compute system. Each software instantiation can be uniquely associated with a single-tenant account from the set of single-tenant accounts. Having a separate software instantiation for each client allows that client to maintain control and privacy over data of the client and processing of data of the client compared to some known multi-tenant systems. In addition, the multi-tenant systems and methods described herein can separately process service a request(s) related to each fourth party from the set of fourth parties (1) without using a different software for any two fourth parties from the set of fourth parties, (2) based on a set of customizable parameters specific to that fourth party, and (3) based on the first set of information processing multiple service requests. Therefore, the multi-tenant systems and methods described herein can process a high-volume of requests (2 requests, 5 requests, 10 requests, 50 requests, 100 requests, 500 requests, 1000 request, 5000 request, 10,000 requests, and/or the like) without using a different software for any two fourth parties from the set of fourth parties (2 fourth parties, 5 fourth parties, 10 fourth parties, 50 fourth parties, 100 fourth parties, 500 fourth parties, 1000 fourth parties, 5000 fourth parties, 10,000 fourth parties, and/or the like).

FIG. 1 is a block diagram of a multitenant computing environment 100, according to an embodiment. The multi-tenant computing environment 100 can include a client compute device 110, a third-party compute device 120, and a multi-tenant computer system 130, that can automatically and scalable produce service results in response to service request. The client compute device 110, the third-party compute device 120, and the multi-tenant computer system 130, each can be/include a hardware-based computing device(s) and/or a multimedia device(s), such as, for example, a computer(s), a desktop device(s), a laptop(s), a smartphone(s), and/or the like.

The client compute device 110 can include a memory (not shown), a communication interface (not shown), and a processor (not shown). The memory (e.g., a random-access memory (RAM), a hard drive, a flash drive, and/or the like)

of the client compute device 110 can store data (e.g., service requests, service results, transactional data, public information, and/or the like), and/or code that includes instructions to cause the processor to perform one or more processes or functions (e.g., a code to fetch an authentication code from the third-party compute device 120). The communication interface (e.g., a network interface card (NIC), a Wi-Fi® transceiver, and/or the like) of the client compute device 110 can be a hardware component that facilitates data communication between the client compute device 110 and external devices (e.g., the third-party compute device 120, the multi-tenant computer system 130, and/or the like). The processor (a central processing unit (CPU), a graphics processing unit (GPU), and/or the like) can be, for example, a hardware-based integrated circuit (IC) or any other suitable processing device configured to run or execute a set of instructions or a set of codes. The client compute device 110 can transmit data (e.g., a service request 151) to the third-party compute device 120 and/or to the multi-tenant computer system 130 and receive data (e.g., service results 152) from the third-party compute device and/or from the multi-tenant computer system 130.

The third-party compute device 120 include a memory, a communication interface and/or a processor that are structurally and/or functionally similar to the memory, the communication interface and/or the processor as described with respect to the client compute device 110. The third-party compute device 120 can receive or send data including, for example, an authentication token(s), a first set of information and/or a second set of information. The third-party compute device 120 includes a set of modules (can also be referred to as a 'software). The set of modules of the third-party compute device 120 includes an authentication service 121, a data warehouse 122, a billing queue 123, a configuration store 124, a lookups database 125, and a property database 126. In some implementations, each module from the set of modules can be implemented in a set of codes representing instructions that can be executed on a processor (e.g., a CPU, a GPU, and/or the like). In some implementations, each module from the set of modules can be implemented on specific hardware (e.g., an application specific integrated circuits (ASIC)).

The authentication service 121 can, for example, generate and provide an authentication token(s) to the client compute device 110. The authentication token provided by the authentication service 121 can be used in a service request(s) generated by the client compute device 110 and transmitted to the multi-tenant computer system 130. The authentication token combined with client specific parameters can be used to uniquely identify and authenticate a single-tenant account. The data warehouse 122 is a module that can include codes to receive, store, and/or send data in a memory of the third-party compute device 120. In some instances, the data warehouse 122 can include codes to receive, store, and/or send data in a memory of an external database server that is operatively coupled to the third-party compute device. For example, the data warehouse 122 can receive the second set of information from the multi-tenant computer system 130 associated to a service request and/or a service result. The billing queue 123 is a module that can include codes to receive billing information, from the multi-tenant computer system 130. The billing information can be associated with a service request and/or a service result. The configuration store 124 is a module that can include codes to receive, store, and/or send configuration parameters and/or encrypted configuration parameters. The lookups database 125 is a module that can include codes to receive, store, and/or send publicly-available information. The property database 126 is a module that can include codes to receive, store, and/or send property information. The configuration store 124, the lookups database 125, and/or the property database 126 can send the respective configuration parameters, respective publicly-available information, and/or property information to the multi-tenant computer system 130.

The multi-tenant computer system 130 can include one or more compute device mediums particularly suitable for data storage and/or one or more compute device mediums particularly suitable for data processing. For example, the multi-tenant computer system 130 can include multiple databases, compute devices, and/or high-performance servers that can be physically at separate locations and connected via a network (not shown). The multi-tenant computer system 130 can include, for example, a network of electronic memories (e.g., memories of a database in a data center), a network of magnetic memories (e.g., memories of a database in a data center), a server(s), a blade server(s), a network attached storage(s), and/or the like. In some implementations, a medium from the one or more compute device mediums of the multi-tenant computer system 130 can include a memory, a communication interface, and a processor that are structurally and/or functionally similar to the memory, the communication interface and the processor as described with respect to the client compute device 110. In some implementations, however, a medium of the multi-tenant computer system 130 can include a memory, a communication interface and/or a processor that are application specific (e.g., deep learning storage server, parallel computing device, etc.) that are structurally and/or functionally different than the memory, the communication interface and the processor as described with respect to the client compute device 110.

The multi-tenant computer system 130 includes a set of modules (can also referred to as a 'software services'). The set of modules of the multi-tenant computer system 130 includes an application programming interface (API) 131, a client database 132, an order queue 133, an order processor 134, a result queue 135, and a result transmitter 136. In some implementations, each module from the set of modules can be implemented in a set of codes representing instructions that can be executed on a set of processors (e.g., on a high-performance compute device(s) and/or a distributed compute device(s)). In some implementations, each module from the set of modules can be implemented on specific hardware (e.g., an AISC). The multi-tenant computer system 130 can receive a service request 151 from the client compute device 110. The API 131 of the multi-tenant computer system 130 can, for example, present a graphical user interface, via a display (not shown) of the client compute device 110 to send the service request 151 and/or receive service results 152. The client database 132 can maintain records of information about current and/or past clients of the client compute device(s) 110. The order queue 133 can, for example, be configured to prioritize processing of service requests received from multiple clients. For example, service requests can be timestamped at the order queue 133 and processed by the order processor 134 in the order received.

The order processor 134 can be configured to fetch/receive a first set of information 161 and/or send a second set of information 162 from the third-party compute device 120. The order processor 134 can be further configured to process the service request 151 received from the client compute device 110 and produce service results based on at least the service request 151, the first set of information 161, and/or the second set of information. The result queue 135 can be configured to determine and/or store a queue for transmitting service result to multiple clients in response to the service requests received from the multiple clients. In one example, the result queue 135 can determine to send a first service result to a first client compute device (not shown) at a first time and send a second service result to a second client compute device (not shown) at a second time after the first time. In another example, the result queue 135 can determine to send the first service result and a third service result, in parallel and respectively, to a first client compute device (not shown) and a third compute device (not shown) at a first time, and send a second service result and a fourth service result, in parallel and respectively, to a second client compute device (not shown) and a fourth client compute device (not shown) at a second time after the first time.

In use, the client compute device 110 can transmit a service request 151 (e.g., a search query, a request to confirm an eligibility, and/or the like) to the multi-tenant computer system 130 and receive service results 152 (e.g., search results, an indication of eligibility, and/or the like) from the multi-tenant computer system 130 in response to the service request. The service request 151 can include an authentication token provided by the third-party compute device 120. The service request 151 can identify a single-tenant account of the multi-tenant computer system 130 and/or be associated with the client compute device 110. The result transmitter 136 of the multi-tenant computer system 130 can be configured to transmit the service results 152 to the client compute device 110. In one example, the service results 152 can include result of an order received from the client compute device 110 along with a printable document file (PDF) report of the service results and/or supporting data in JavaScript® Object Notation (JSON) format. In some instances, the client compute device 110 and the authentication service 121 of the third-party compute device 120 can fetch authentication token from one-another to establish an authenticated communication between the client compute device 110 and the third-party compute device 120.

The multi-tenant computer system 130 can receive a first set of information 161 from the third-party compute device 120 and send a second set of information 162 to the third-party compute device 120. The first set of information 161 can include, for example, a set of configuration parameters fetched from the configuration store 124, a set of global lookups (e.g., curative turnaround times) from the lookup database 125, and/or a set of public records from a public record database(s). The second set of information 162 can include, for example, a set of anonymized statistics for reporting sent to the data warehouse 122 and/or a set of order identifications (ID) and a set of type of billing sent to the billing queue 123. In some instances, the order processor 134 of the multi-tenant computer system 130 can fetch the first set of information 161 from and send the second set of information 162 to the third-party compute device 120.

In some instances, each client of the client compute device 110 included within a set of client compute devices (not shown) can have a single-tenant account from a set of single-tenant accounts and access a software instantiation from a set of software instantiations stored and executed on the multi-tenant compute system 130. Each software instantiation from the plurality of software instantiations can be stored in at least one multi-tenant computer system (e.g., the multi-tenant compute system 130) and can be uniquely associated with the single-tenant account from the set of single-tenant accounts. Each software instantiation from the set of software instantiation can include a set of functions and procedures represented by the application programming interface 131. The set of functions and procedures represented by in the application programming interface 131 can be executed by, for example, a processor of the multi-tenant compute system 130. Having a separate software instantiation for each client allows that client to maintain control and privacy over data of the client and processing of data of the client. Each client compute device can contact the third-party compute device 120 for generating and sending the authentication token, performing billing updates, and sending configuration parameters to customize the software instantiation for the single-tenant account of the client on at least one multi-tenant computer system.

The multi-tenant system 130 can perform a process(es) described herein separately for each fourth party from a set of fourth parties (not shown) to produce a set of service results. The set of fourth parties can include compute devices that can send/receive data to/from to the multi-tenant system 130. For example, one or more fourth parties from the set of fourth parties can send credit data to the multi-tenant system 130 so that the multi-tenant system 130 can use that credit data (in conjunction with other data and features discussed herein) to produce the set of service results. The multi-tenant system 130 can separately process for each fourth party from the set of fourth parties (1) without using a different software for any two fourth parties from the set of fourth parties, (2) based on a set of customizable parameters specific to that fourth party, and (3) based on the first set of information. After separately performing a process(es) (e.g., processing datasets, processing documents, and/or the like) for each fourth party from the set of fourth parties and producing the set of service results, the multi-tenant computer system 130 can send the set of service results to the client compute device 110. In some instances, the set of fourth parties can send/receive data to/from to the multi-tenant system 130 indirectly and via the third-party compute device 120. For example, a client of the client compute device 120 can work with multiple fourth parties via the multi-tenant computer system 130. Nothing prevents the client of the client compute device 110 from running a software instantiation (e.g., via an application, a web browser, and/or the like) that has a unique set of parameters to define a decision flow via the multi-tenant computer system to support each of the fourth parties supported by the client of the client compute device 110. In some instances, the client of the client compute device 110 can have control and dashboard visibility of one or more supported fourth parties; in other instances, the client of the client compute device 110 does not have control and dashboard visibility of one or more supported fourth parties.

The multi-tenant computer system 130 can store transactional data (can be also referred to as 'client transactional data') associated with a client of the client compute device 110. The transactional data is not accessible by and not provided to the third-party compute device 120. As a result, the client(s) of the client compute device 110 can keep the transactional data about the client(s) at the client compute device 110 and/or the multi-tenant server device 130, but the third-party compute device 120 is not be provided a copy of the transactional data. Moreover, in some instances, the transactional data of the client is not accessible by and not provided to the compute device for each fourth party from the set of fourth parties. In some instances, however, the second set of information sent from the multi-tenant computer system 130 to the third-party compute device 120 can include, for example, billing data, reporting data and/or performance data. The billing data can include, for example, account information and information about tasks to be billed, etc., which can be used generate a bill for the user(s) of the client compute device 110. The performance data can include, for example, a set of metrics associated with the software instantiation's storage load, processing load, and/or an overall health (e.g. transactions per second, requests per second, timing for results returned, and/or the like). The reporting data can include, for example, a set of characteristics (e.g., a progress log, a processing speed, and/or the like) about how a file (e.g., a request) from the client compute device 110 is processed. The billing data, reporting data and/or performance data can be generated, for example, at the multi-tenant computer system 130 and relate to the client of the client compute device 110.

In some implementations, the client compute device 110, the third-party compute device 120, and the multi-tenant compute device 130 can communicate data (e.g., the service request 151, the service results 152, the first set of information 161, the second set of information 162, and/or the like) via a network (not shown). The network can be or include, for example, a digital telecommunication network of servers and/or compute devices. The servers and/or computes device of the network can be connected via one or more wired or wireless communication networks (not shown) to share resources such as, for example, data storage and/or computing. The wired or wireless communication networks between servers and/or compute devices of the network can include one or more communication channels, for example, a radio frequency (RF) communication channel(s), a fiber optic commination channel(s), and/or the like. The network can be and/or include, for example, the Internet, an intranet, a local area network (LAN), and/or the like.

Although the client compute device 110, the third-party compute device 120, and the multi-tenant computer system 130 are shown and described as singular devices and system, it should be understood that, in some embodiments, one or more client compute devices, one or more third-party compute devices, and/or one or more multi-tenant computer system can be used in the multitenant computing environment 100.

FIG. 2 is a flowchart of a method 200 of processing a service request and producing service results in response to the service request, according to an embodiment. In some implementations, a multi-tenant computer system (such as the multi-tenant computer system 130 as shown and described with respect to FIG. 1) can be used to perform the method 200. At 201, a service request is received from a client compute device at a multi-tenant computer system (e.g., the multi-tenant computer system 130). The service request can include an authentication token provided by a third-party compute device and that identifies a single-tenant account (1) of the multi-tenant computer system and (2) associated with the client compute device. The method 200 can optionally include sending a set of application programming interface (API) calls to a set of publicly-available databases to retrieve publicly-available information. The publicly-available information can be received at the multi-tenant computer system in response to the set of API calls. The code to process the service request includes code to process the service request based on the publicly-available information. The method 200 can optionally include storing transactional data associated with a client of the client compute device at the multi-tenant computer system. The transactional data is not accessible by and not provided to the third-party compute device.

At 202, an information request for a first set of information associated with the service request is sent from the multi-tenant computer system to the third-party compute device. The first set of information can include encrypted configuration parameters and encrypted publicly-available information. The method 200 can optionally include decrypting the encrypted configuration parameters and the encrypted publicly-available information based on the authentication token to produce configuration parameters and publicly-available information, respectively. At 203, the first set of information in response to the information request is received at the multi-tenant computer system from the third-party compute device. At 204, the service request is processed at the multi-tenant computer system, based on the first set of information to produce a service result responsive to the service request. In some instances, the service request can be processed based on the configuration parameters and the publicly-available information.

At 205, the service result is sent to the client compute device and from the multi-tenant computer system. At 206, a second set of information including billing data, reporting data and/or performance data can be sent to the third-party compute device and from the multi-tenant computer system.

In some instances, the method 200 can optionally include code to process separately for each fourth party from a set of fourth parties (1) without using a different software for any two fourth parties from the set of fourth parties, (2) based on a set of customizable parameters (a) from a set of sets of customizable parameters and (b) specific to that fourth party, and (3) based on the first set of information, to produce a set of service results that include the service result. The set of service results can be sent to the client compute device from the multi-tenant computer system. The second set of information (e.g., billing data, reporting data and/or performance data) can be sent based on the service request and the set of service results. The set of service results can include, for example, a printable document file (PDF) report of the service results and/or supporting data in JavaScript Object Notation (JSON) format.

In some implementations, the client compute device can be from a set of client compute devices and the single-tenant account can be from a set of single-tenant accounts of at least one multi-tenant computer system. The multi-tenant computer system can be included within the at least one multi-tenant computer system. A code to receive the service request, a code to send the information request, a code to receive the first set of information, a code to process, a code to the service result and a code to send the second set of information collectively define a software instantiation from a set of software instantiations. Each software instantiation from the set of software instantiations can be stored in the at least one multi-tenant computer system and uniquely associated with a single-tenant account from the set of single-tenant accounts.

In some embodiments, the third-party compute device can be included within the multi-tenant computer system with which a third party of the third-party compute device has an account different from the single-tenant account associated with the client compute device.

Although the method 200 shows and describes processing the service request at the multi-tenant compute system to generate service results and sending the service results, based on information provided by the third-party compute device, in some embodiments, such as a method 300 (shown and described with respect to FIG. 3), the multi-tenant system can process the service request separately for each fourth party from a set of fourth parties and send the service results, without particularly sending/receiving information to/from the third-party compute device.

FIG. 3 is a flowchart of a method 300 of processing a service request separately for each fourth party from a set of fourth parties and producing service results in response to the service request, according to an embodiment. In some implementations, a multi-tenant computer system (such as the multi-tenant computer system 130 as shown and described with respect to FIG. 1) can be used to perform the method 300. At 301, a service request is received from a client compute device at a multi-tenant computer system (e.g., the multi-tenant computer system 130). In some embodiments, the service request can include an authentication token provided by a third-party compute device and that identifies a single-tenant account (1) of the multi-tenant computer system and (2) associated with the client compute device. At 302, an information request for a first set of information associated with the service request is sent from the multi-tenant computer system. At 303, the first set of information in response to the information request is received at the multi-tenant computer system.

At 304, the service request is processed separately for each fourth party from a set of fourth parties, at the multi-tenant computer system. The service request can be based on the first set of information (e.g., configuration parameters and/or publicly-available information) to produce a set of service results responsive to the service request. In some instances, the service request can be processed based on the configuration parameters and the publicly-available information. At 305, the service result is sent to the client compute device and from the multi-tenant computer system. At 306, a second set of information associated with the service request and the set of service results is sent from the multi-tenant computer system.

Although the method 200 and the method 300 show and describe processing the service request at the multi-tenant compute system to generate service results and sending the service results, in some embodiments, such as a method 400 (shown and described with respect to FIG. 4), the multi-tenant system can include a set of (e.g., multiple) software instantiation of a set of clients and can process each service request of a client from the set of clients at a respective software instantiation associated with that respective client.

FIG. 4 is a flowchart of a method of processing a service request of a software instantiation of a client from a set of software instantiations of a set of clients, and producing service results in response to the service request. In some implementations, a multi-tenant computer system (such as the multi-tenant computer system 130 as shown and described with respect to FIG. 1) can be used to perform the method 200. At 401, a software instantiation is defined that is (1) to be included within a set of software instantiations, (2) stored in at least one multi-tenant computer system, and (3) uniquely associated with a single-tenant account to be included within a set of single-tenant accounts. At 402, a service request can be received from a client compute device to be included within a set of client compute devices and at the at least one multi-tenant computer system via an application programming interface (API). The service request includes an authentication token provided by a third-party compute device and that identifies the single-tenant account. The single-tenant account is associated with the client compute device. At 403, an information request for a first set of information associated with the service request is sent, from the at least one multi-tenant computer system and to the third-party compute device.

At 404, the first set of information is received, at the at least one multi-tenant computer system and from the third-party compute device, in response to the information request. At 405, the service request can be automatically process the service request separately for each fourth party from a set of fourth parties, at the at least one multi-tenant computer system. The service request is processed (1) without using a different software for any two fourth parties from the set of fourth parties, (2) based on a set of customizable parameters (a) from a set of sets of customizable parameters and (b) specific to that fourth party, and (3) based on the first set of information, to produce a set of service results responsive to the service request. At 406, the set of service results are sent, to the client compute device and from the at least one multi-tenant computer system. At 407, a second set of information is sent to the third-party compute device from the at least one multi-tenant computer system. The second set of information is associated with the service request and the set of service results.

In some instances, the method 400 optionally include sending a set of API calls to a set of publicly-available databases to retrieve publicly-available information. The publicly-available information can then be retrieved in response to the set of API calls. For each fourth party from the set of fourth parties, the service request can be processed based on the publicly-available information. In some instances, each fourth party from the set of fourth parties can be, include or control a publicly-available database.

In some instances, the method 400 optionally stores transactional data of a client of the client compute device and/or transactional data of a customer of the client of the client compute device at the multi-tenant computer system. The transactional data of the client is not accessible by and not provided to a compute device for each fourth party from the set of fourth parties. The transactional data of the customer is not accessible by and not provided to either of the third-party compute device and the compute device for each fourth party from the set of fourth parties.

In some instances, the method 400 optionally include processing the service request separately for each fourth party from a set of fourth parties (1) without using a different software for any two fourth parties from the set of fourth parties, and (2) based on a set of customizable parameters (a) from sets of customizable parameters and (b) specific to that fourth party.

The service request mentioned above with respect to multitenant computing environment 100 of FIG. 1, method 200 of FIG. 2, method 300 of FIG. 3, and method 400 of FIG. 4 can include, for example, a loan request(s), a credit estimation request(s), a title and property underwriting request(s), and/or the like. The service results mentioned above can include, for example, a yes or no response to a loan request, a report(s) generated in response to the load request, a report(s) generated in response to the title and property underwriting request, a credit estimate(s), and/or the like. In one example, report of the service result can include information to title search processors, examiners, and title curative personnel.

In one example, a client (e.g., a mortgage lender, a bank, and/or the like) can work with multiple underwriters via the multi-tenant computer system. The client can run an application instance (e.g., via a software, an application, a web browser, and/or the like) that has a set of parameters specific to that client to define a decision flow via the multi-tenant computer system to support each of the client's supported underwriters. Therefore, the client has control and dashboard visibility of all supported underwriters. In another example, the client can access to and/or subscriptions to multiple external public databases (e.g., databases that include property records, credit score service provider, and/or the like) via the multi-tenant computer system. The client can run the application instance via the multi-tenant computer system to support each of the client's supported external public databases.

In one example, a multi-tenant computer system (e.g., the multi-tenant computer system 130 as shown and described with respect to FIG. 1) can receive a loan request from a client (e.g., using the client compute device 110 of FIG. 1). The loan request can include an authentication token (e.g., provided by the third-party compute device 120 of FIG. 1). The loan request identifies a single-tenant account of the multi-tenant computer system and is associated with the client compute device. The multi-tenant computer system sends a request for information (e.g., credit score, property records, ownership data, public financial data) associated with the loan request (e.g., to the third-party compute device 120 and/or external public databases). The multi-tenant computer system receives and processes the requested information together with the loan request, and generates a report(s) in response to the loan request. The generated report(s) is then sent to the client. In addition, the multi-tenant computer system can send billing data, reporting data and/or performance data generated at the multi-tenant computer system to a third-party compute device (e.g., the third-party compute device 120 of FIG. 1).

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory processor-readable medium storing code representing instructions to be executed by a processor, the code comprising code to cause the processor to:
receive, from a client compute device and at a multi-tenant computer system, a service request that includes an authentication token provided by a third-party compute device and that identifies a single-tenant account (1) of the multi-tenant computer system and (2) associated with the client compute device;
send, from the multi-tenant computer system to the third-party compute device, an information request for a first set of information associated with the service request;
receive, at the multi-tenant computer system from the third-party compute device, the first set of information in response to the information request;
process, at the multi-tenant computer system, the service request based on the first set of information to produce a service result responsive to the service request;
send, to the client compute device and from the multi-tenant computer system, the service result; and
send, to the third-party compute device and from the multi-tenant computer system, a second set of information including at least one of billing data, reporting data or performance data, associated with the service request and the service result.

2. The non-transitory processor-readable medium of claim 1, wherein the third-party compute device is included within a multi-tenant computer system with which a third party of the third-party compute device has an account different from the single-tenant account associated with the client compute device.

3. The non-transitory processor-readable medium of claim 1, wherein:
the client compute device is included within a plurality of client compute devices, the single-tenant account is included within a plurality of single-tenant accounts of at least one multi-tenant computer system, the multi-tenant computer system included within the at least one multi-tenant computer system,
the code to receive the service request, the code to send the information request, the code to receive the first set of information, the code to process, the code to the service result and the code to send the second set of information collectively defining a software instantiation from a plurality of software instantiations, each software instantiation from the plurality of software instantiations being stored in the at least one multi-tenant computer system and uniquely associated with a single-tenant account from the plurality of single-tenant accounts.

4. The non-transitory processor-readable medium of claim 1, further comprising code to cause the processor to:
send a plurality of application programming interface (API) calls to a plurality of publicly-available databases to retrieve publicly-available information; and
receive the publicly-available information in response to the plurality of API calls,
the code to process the service request including code to process the service request based on the publicly-available information.

5. The non-transitory processor-readable medium of claim 1, further comprising code to cause the processor to:
store, at the multi-tenant computer system, transactional data associated with a client of the client compute device,
the transactional data not accessible by and not provided to the third-party compute device.

6. The non-transitory processor-readable medium of claim 1, wherein the first set of information includes encrypted configuration parameters and encrypted publicly-available information, the non-transitory processor-readable medium further comprising code to cause the processor to:
decrypt the encrypted configuration parameters and the encrypted publicly-available information based on the authentication token to produce configuration parameters and publicly-available information, respectively,
the code to process including code to process the service request based on the configuration parameters and the publicly-available information.

7. The non-transitory processor-readable medium of claim 1, wherein:
the code to process includes code to process separately for each fourth party from a plurality of fourth parties (1) without using a different software for any two fourth parties from the plurality of fourth parties, (2) based on a set of customizable parameters (1) from a plurality of sets of customizable parameters and (b) specific to that fourth party, and (3) based on the first set of information, to produce a plurality of service results that include the service result,
the code to send the service result including code to send the plurality of service results, and
the code to send the second set of information including code to send the second set of information based on the service request and the plurality of service results.

8. A non-transitory processor-readable medium storing code representing instructions to be executed by a processor, the code comprising code to cause the processor to:

receive, from a client compute device and at a multi-tenant computer system, a service request associated with a single-tenant account (1) of the multi-tenant computer system and (2) associated with the client compute device;

send, from the multi-tenant computer system, an information request for a first set of information associated with the service request;

receive, at the multi-tenant computer system, the first set of information in response to the information request;

process separately for each fourth party from a plurality of fourth parties, at the multi-tenant computer system, the service request based on the first set of information to produce a plurality of service results responsive to the service request;

send, to the client compute device and from the multi-tenant computer system, the plurality of service results; and send, from the multi-tenant computer system, a second set of information associated with the service request and the plurality of service results.

9. The non-transitory processor-readable medium of claim 8, wherein:

the service request includes an authentication token provided by a third-party compute device that identified the singe-tenant account, the code to send the second set of information includes code to send the second set of information to the third-party compute device, the second set of information including reporting information and billing information associated with the single-tenant account.

10. The non-transitory processor-readable medium of claim 9, wherein the third-party compute device is included within a multi-tenant computer system with which a third party of the third-party compute device has an account different from the single-tenant account associated with the client compute device.

11. The non-transitory processor-readable medium of claim 8, wherein:

the client compute device is included within a plurality of client compute devices, the single-tenant account is included within a plurality of single-tenant accounts of at least one multi-tenant computer system, the multi-tenant computer system included within the at least one multi-tenant computer system, the code to receive the service request, the code to send the information request, the code to receive the first set of information, the code to process, the code to send the service result and the code to send the second set of information collectively defining a software instantiation from a plurality of software instantiations, each software instantiation from the plurality of software instantiations being stored in the at least one multi-tenant computer system and uniquely associated with a single-tenant account from the plurality of single-tenant accounts, each software instantiation from the plurality of software instantiations not stored at the third-party compute device.

12. The non-transitory processor-readable medium of claim 8, further comprising code to cause the processor to:

send a plurality of application programming interface (API) calls to a plurality of publicly-available databases to retrieve publicly-available information; and receive the publicly-available information in response to the plurality of API calls, the code to process the service request including code to process the service request based on the publicly-available information.

13. The non-transitory processor-readable medium of claim 11, wherein:

the service request includes an authentication token provided by a third-party compute device that identified the singe-tenant account, the code to send the second set of information includes code to send the second set of information to the third-party compute device, the second set of information including reporting information and billing information associated with the single-tenant account.

14. The non-transitory processor-readable medium of claim 8, further comprising code to cause the processor to:

store, at the multi-tenant computer system, private info associated with a client of the client compute device, the transactional data not accessible by and not provided to a third-party compute device.

15. The non-transitory processor-readable medium of claim 8, wherein the first set of information includes encrypted configuration parameters and encrypted publicly-available information, the non-transitory processor-readable medium further comprising code to cause the processor to:

decrypt the encrypted configuration parameters and the encrypted publicly-available information based on the authentication token to produce configuration parameters and publicly-available information, respectively, the code to process including code to process the service request based on the configuration parameters and the publicly-available information.

16. A non-transitory processor-readable medium storing code representing instructions to be executed by a processor, the code comprising code to cause the processor to:

define a software instantiation that is (1) to be included within a plurality of software instantiations, (2) stored in at least one multi-tenant computer system, and (3) uniquely associated with a single-tenant account to be included within a plurality of single-tenant accounts, the code to define including code to:

receive, from a client compute device to be included within a plurality of client compute devices and at the at least one multi-tenant computer system via an application programming interface (API), a service request that includes an authentication token provided by a third-party compute device and that identifies the single-tenant account, the single-tenant account being associated with the client compute device;

send, from the at least one multi-tenant computer system and to the third-party compute device, an information request for a first set of information associated with the service request;

receive, at the at least one multi-tenant computer system and from the third-party compute device, the first set of information in response to the information request;

automatically process separately for each fourth party from a plurality of fourth parties, at the at least one multi-tenant computer system, the service request (1) without using a different software for any two fourth parties from the plurality of fourth parties, (2) based on a set of customizable parameters (a) from a plurality of sets of customizable parameters and (b) specific to that fourth party, and (3) based on the first set of information, to produce a plurality of service results responsive to the service request;

send, to the client compute device and from the at least one multi-tenant computer system, the plurality of service results; and send, to the third-party compute device and from the at least one multi-tenant computer system, a second set of information associated with the service request and the plurality of service result.

17. The non-transitory processor-readable medium of claim 15, further comprising code to cause the processor to:

send a plurality of application programming interface (API) calls to a plurality of publicly-available databases to retrieve publicly-available information; and receive the publicly-available information in response to the plurality of API calls, the code to automatically process including code to process separately for each fourth party from the plurality of fourth parties the service request based on the publicly-available information.

18. The non-transitory processor-readable medium of claim 15, further comprising code to cause the processor to:

store, at the multi-tenant computer system, transactional data of a client of the client compute device and transactional data of a customer of the client of the client compute device, the transactional data of the client not accessible by and not provided to a compute device for each fourth party from the plurality of fourth parties, the transactional data of the customer not accessible by and not provided to either of the third-party compute device and the compute device for each fourth party from the plurality of fourth parties.

19. The non-transitory processor-readable medium of claim 15, wherein the first set of information includes encrypted configuration parameters and encrypted publicly-available information, the non-transitory processor-readable medium further comprising code to cause the processor to:

decrypt the encrypted configuration parameters and the encrypted publicly-available information based on the authentication token to produce configuration parameters and publicly-available information, respectively, the code to process including code to process the service request based on the configuration parameters and the publicly-available information.

20. The non-transitory processor-readable medium of claim 15, wherein:

the code to send the information request includes code to send the information request to cause the third-party compute device to send, in response to the information request, a plurality of API calls to a plurality of publicly-available databases to retrieve the publicly-available information, the publicly-available information including a plurality of information sets, each information set from the plurality of information sets being received from a publicly-available database from the plurality of publicly-available databases, the first set of information including an aggregation of the plurality of information sets.

21. The non-transitory processor-readable medium of claim 15, wherein:

the code to automatically process includes code to automatically process separately for each fourth party from a plurality of fourth parties (1) without using a different software for any two fourth parties from the plurality of fourth parties, and (2) based on a set of customizable parameters (a) from a plurality of sets of customizable parameters and (b) specific to that fourth party.

\* \* \* \* \*